May 15, 1962  O. BARRINGTON  3,034,832
HAY BALER TRAILER

Filed March 20, 1961  2 Sheets-Sheet 1

Otto Barrington
INVENTOR.

BY Floyd Trimble
Attorney

May 15, 1962     O. BARRINGTON     3,034,832
HAY BALER TRAILER
Filed March 20, 1961     2 Sheets-Sheet 2
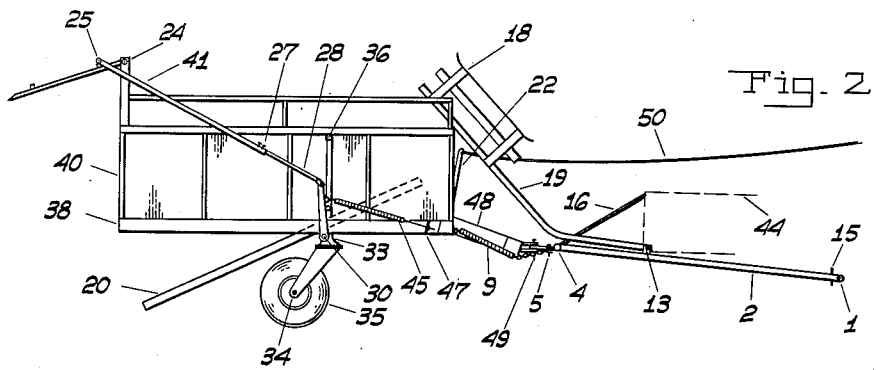
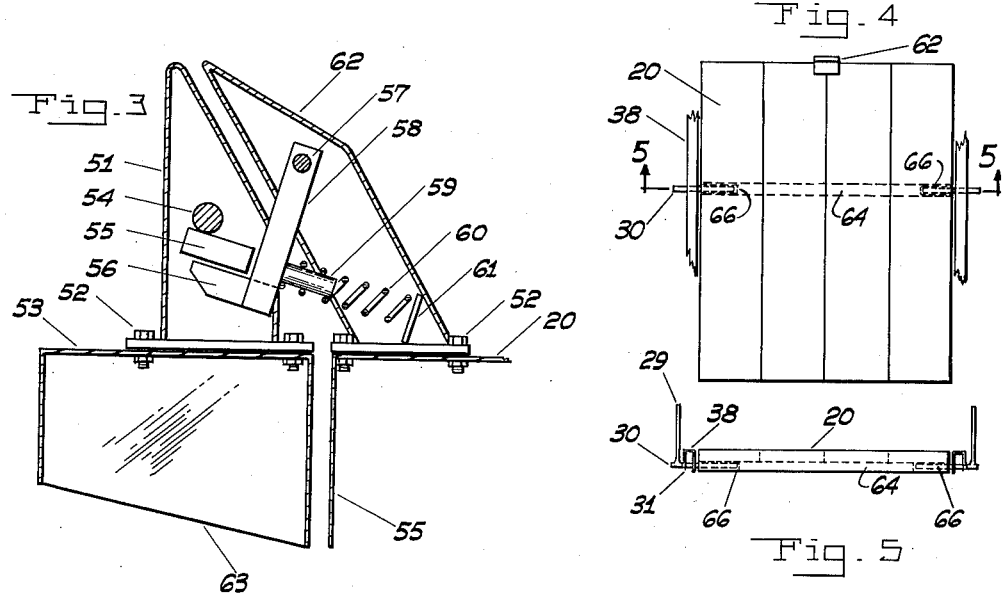
Otto Barrington
INVENTOR.
BY Floyd Trimble
Attorney United States Patent Office 3,034,832
Patented May 15, 1962

3,034,832
HAY BAILER TRAILER
Otto Barrington, Rte. 3, Chickasha, Okla.
Filed Mar. 20, 1961, Ser. No. 96,963
2 Claims. (Cl. 298—26)

This invention relates to a hay baler trailer and more particularly it relates to a trailer which may be attached to a hay baler to receive the bales of hay and after a plurality of bales have been received the entire contents of the trailer may be discharged simultaneously.

In the past when hay is baled in the field the usual practice is to gather the hay with a hay baler which compresses the hay into a bale and after the bale is formed eject the bale onto the ground. This, of course, means that the bales of hay are scattered more or less uniformly over the entire field. Since every bale must be picked up, the resulting labor costs are high. Various attempts have been made to overcome that disadvantage. None of these proposed methods, to the best of my knowledge, have been entirely satisfactory. This has been true because when one disadvantage was eliminated the modification has introduced another disadvantage. As for example, it has been proposed that a second vehicle be moved along behind the baler to receive the bales of hay. Such vehicles as heretofore employed for this purpose have necessitated the employment of an extra man to load those vehicles.

It is, therefore, a principal object of the present invention to provide a hay baler trailer the use of which obviates the disadvantages of the prior art trailers.

It is another object of my invention to provide a hay baler trailer the loading and unloading of which can be easily controlled by the operator of the hay baler.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawings in which like numerals are employed to designate like parts throughout setting forth in detail certain illustrative embodiments of the invention, these being indicative, however, of but a few of the various ways in which the principle of the invention may be employed.

In said annexed drawings:

FIGURE 2 is a side elevation of the trailer wherein the floor and the rear enclosure are in the unloading position;

FIGURE 3 is an enlarged view of the releasable lock which holds the floor parallel with the trailer frame;

FIGURE 4 is a top view of the trailer floor; and,

FIGURE 5 is a cross sectional view of FIGURE 4 taken along the plane and in the direction substantially indicated by the line and the arrows at 5—5.

Figure 1:
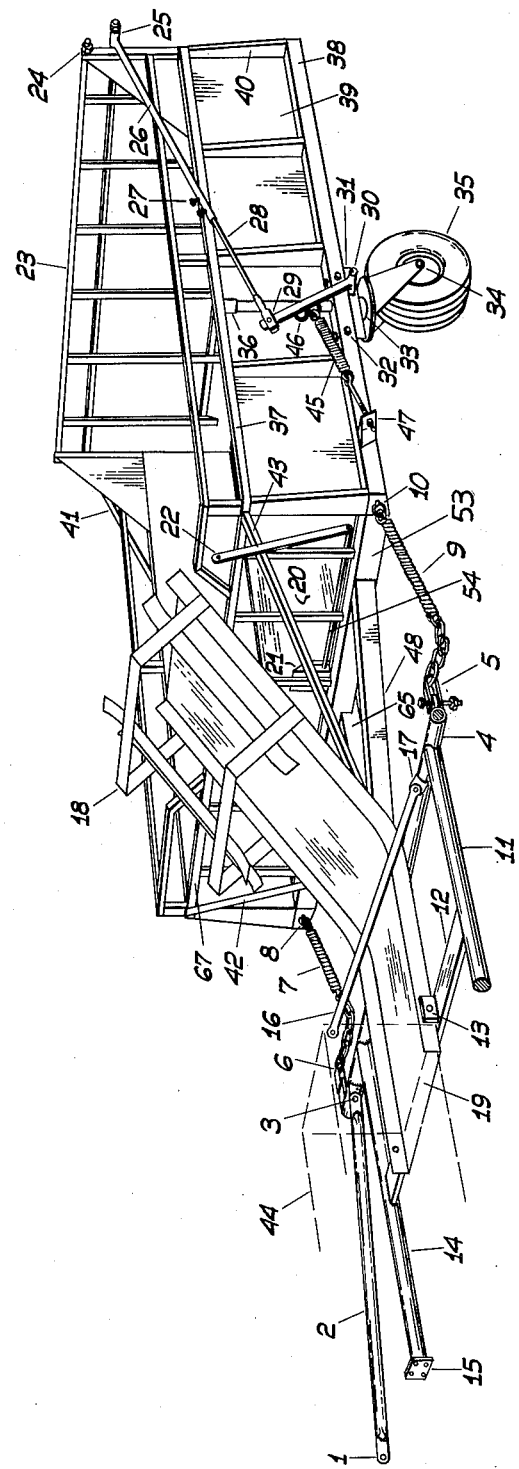
FIGURE 1 is a perspective view of the trailer constructed in accordance with the present invention.

Referring to the drawings and to FIGURES 1 and 2 in particular the numeral 38 refers to two beams forming the side frame members of the trailer which are held in parallel relationship by cross beam 53. Two roller bearings automobile type wheels 35 attach to side beams 38 by means of the casters 33. The wheel is supported on an automotive type axle assembly 34. In the preferred embodiment of the invention the caster 33 is equipped with double tapered roller bearings. This permits the caster assembly to rotate freely in a horizontal plane. It will be obvious to those skilled in the art that other means could be used to accomplish the same result. Preferably the wheels are so positioned on the trailer that it is almost balanced wherein the front end is slightly heavier than the rear end. This not only facilitates towing the trailer behind the hay baler but the storage of the trailer when the latter is not in use as well. The trailer will operate, however, with the wheels mounted farther toward the front of the trailer or even near the rear thereof if certain simple modifications are made to the trailer. Since these modifications are simple and will be readily apparent to those skilled in the art they will not be discussed further particularly in view of the fact that such a modification is generally undesirable. That portion of the trailer hitch designated by the numerals 4, 11, 12 and 14 are rigidly attached to the hay baler by means of bolts through plate 15. Additional rigidity is obtained by a bolt through eye 1 of rod 2 which is bolted to rod 4 at 3. Rod 16 is bolted to the hay baler chute 44 shown in phantom lines and rod 16 is bolted to rod 4 at 17. When the trailer hitch is so attached to the hay baler the forward end of chute 19 of the trailer fits beneath and to each side of chute 44. Beams 48 are attached to beam 65 and are inclined inwardly so that they form an apex which is fitted with a clevis-bolt hitch 49 for attachment to the plate extended from rod 4. This clevis-bolt hitch will allow a certain amount of lateral movement. Resilient means consisting of a chain and spring 9 is attached to the trailer at 10 and to the bar 4 by means of the clevis-bolt attachment 5. Likewise the other side of the trailer at 8 is attached to bar 4 by means of the clevis-bolt attachment 6 with the resilient means consisting of a chain and spring 7. This arrangement insures that the trailer will follow the baler accurately and eliminates trailer sway.

The floor 20 of the trailer pivots at 30. When the trailer is empty the tension on the pair of springs 45 causes floor 20 to return to its original position wherein it is again parallel to beams 38. The tension on springs 45 may be varied by an adjustment of nuts 47. This insures when the trailer is empty the rear end of the floor will swing upward until the floor becomes parallel with beams 48. Cross beams toward the forward end (not shown) prevent the floor from rotating any farther than to assume a parallel position. When the floor is so rotated it is locked in that position by the latching means 21. This latch is shown in greater detail in FIGURE 3 where it will be noted that one section 51 is attached to the cross member 53 and one section 62 to the floor 20. In the preferred embodiment of the invention the pivot upon which the floor rotates is so mounted that it is somewhat nearer the front end of the floor than the rear end. I wish to point out, however, that satisfactory results can be obtained even if this preferred embodiment is not followed.

The operation of the trailer can be explained as follows: As pointed out above the trailer is attached to the hay baler by means of bolts or similar means. When a bale of hay is ejected by the baler it moves through chute 44 on the baler to chute 19 and is forced upward by the following bales and finally falls into the trailer body on floor 20. The guides 18 on chute 19 serve to keep the bales from bouncing off over rough ground. When the desired number of bales of hay are in the trailer lever 22 is pulled forward by the hay baler operator pulling on a rope 50 attached to 22. For simplicity this rope or cord is not shown in FIGURE 1. Pulling lever 22 forward causes rod 54 to rotate counterclockwise. Now referring to FIGURE 3 the rotation of rod 54 counterclockwise causes bar 55 which is welded to rod 54 to move in unison thus disengaging the catch 56 fastened to arm 58 which pivots on pin 57. The spring 60 forces arm 58 back to its normal position when the tension on rope 50 is released. When the catch 56 is disengaged the load of bales of hay in the trailer causes the floor 20 to pivot on pivot 30 the rearward end of floor 20 drops down to the ground and at the same time arm 29 moves rearwardly causing arms 28 and 26 to move rearwardly also thus causing the rear enclosure 23 to open by rotating on pivot 24. After the load is discharged the front end of floor 20 moves downward until the floor is parallel with beams 38. As pointed out above this causes the latch 62 to become engaged. The floor rotating to the horizontal position causes the rear enclosure to close.

When it is desired to tow the trailer a rather long distance during which time it is not being used to receive bales of hay such as towing on a highway it is advisable to lock the caster feature of the wheels. This makes it possible to tow the trailer with the same facility as a trailer having a fixed axle for its wheels. Means for accomplishing this feature are well known to those skilled in the art. For example, reference is made to U.S. Patents 2,475,174 and 2,949,317, dated July 5, 1949, and August 16, 1960, respectively.

As pointed out above I prefer to use automobile type wheels and pneumatic tires. It is obvious, however, that other types of wheels may be used if desired. Furthermore satisfactory results will be obtained using solid rubber tires or even metal wheels.

Other modes of applying the principle of the invention may be employed, change being made as regards the details described, provided the features stated in any of the following claims or the equivalent of such be employed.

I, therefore, particularly point out and distinctly claim as my invention:

1. A trailer for use in conjunction with a hay baler, said trailer including a bottom frame consisting of parallel side members spaced apart by means of a cross member, a pair of upstanding side frames arranged in parallel spaced relation and carried by said side members, an upstanding end frame extending between said side frames adjacent the forward end of the latter and secured to said side frame and said bottom frame, hitching means attached to the forward portion of said trailer frame including anti-sway means consisting of resilient linkage members attached by one end thereof to either side of said trailer frame at the forward end thereof, said resilient linkage being adapted when the other end thereof is attached to the hay baler to align said trailer with the hay baler, caster wheels operably mounted on said side members, a floor member, floor pivot means operably associated with said floor member and said side members wherein said pivot is located at a point that is located between the midpoint on the longitudinal axis of said side members and the forward end thereof, a releasable latch attached to said cross member, latch engaging means attached to said floor member, the arrangement of said latch and said latch engaging means being such that when the same is engaged said floor member is retained thereby in a position parallel to said side members, a rear end releasable closure rotatably mounted between said upstanding side frames, linkage means having one end thereof connected to a lever rigidly attached to said floor pivot means and the other end thereof connected to said rear end releasable closure whereby said closure is in an opened position when the rear end of said floor member pivots downwardly and in a closed position when said floor member is latched in a position parallel to said side members, and resilient means wherein one end thereof is attached to said lever which is rigidly attached to said floor pivot means and the other end of said resilient means is attached to said side member whereby said floor member is biased toward a position parallel to said side members, said resilient means including an adjusting portion whereby the biasing force exerted on said floor member may be varied.

2. The trailer of claim 1 including chute means mounted on said trailer arranged and constructed so that bales being ejected from the hay baler when said trailer is attached thereto are discharged into said trailer.

References Cited in the file of this patent

UNITED STATES PATENTS

| | | |
|---|---|---|
| 1,296,562 | Schlaegel | Mar. 4, 1919 |
| 2,605,915 | Day | Aug. 5, 1952 |